United States Patent
Jakobsen

(10) Patent No.: US 12,008,078 B2
(45) Date of Patent: Jun. 11, 2024

(54) CONCEPT FOR ANONYMOUS RE-IDENTIFICATION

(71) Applicant: Grazper Technologies ApS, Copenhagen K (DK)

(72) Inventor: Thomas Jakobsen, Copenhagen K (DK)

(73) Assignee: Grazper Technologies ApS, Copenhagen K (DK)

( * ) Notice: Subject to any disclaimer, the term of this patent is extended or adjusted under 35 U.S.C. 154(b) by 279 days.

(21) Appl. No.: 17/446,175

(22) Filed: Aug. 27, 2021

(65) Prior Publication Data

US 2022/0092343 A1 Mar. 24, 2022

(30) Foreign Application Priority Data

Sep. 22, 2020 (EP) .................................... 20197542

(51) Int. Cl.
*G06T 9/00* (2006.01)
*G06F 18/214* (2023.01)
(Continued)

(52) U.S. Cl.
CPC ............ *G06F 18/22* (2023.01); *G06F 18/214* (2023.01); *G06F 21/602* (2013.01); *G06T 9/00* (2013.01);
(Continued)

(58) Field of Classification Search
CPC ...... G06F 18/22; G06F 18/214; G06F 21/602; G06F 18/2413; G06F 21/6254;
(Continued)

(56) References Cited

U.S. PATENT DOCUMENTS

| 5,596,274 A | * | 1/1997 | Sezginer | ................... | G01V 3/32 |
| | | | | | 324/303 |
| 6,064,738 A | * | 5/2000 | Fridrich | ................... | H04L 9/001 |
| | | | | | 380/243 |

(Continued)

FOREIGN PATENT DOCUMENTS

| CN | 103500345 A | 1/2014 |
| WO | 2016159199 A1 | 10/2016 |

OTHER PUBLICATIONS

Abdurrahman et al., "Enhancing TOTP Protocol by Embedding Current GPS Location", Oct. 2014 (Year: 2014).*

(Continued)

*Primary Examiner* — Aaron W Carter
(74) *Attorney, Agent, or Firm* — Kieran O'Leary; 2SPL Patent Attorneys PartG mbB

(57) ABSTRACT

Examples relate to a concept for anonymous re-identification, more specifically, but not exclusively, to systems, apparatuses, methods and computer programs for performing anonymous re-identification and for training a machine-learning model for use in anonymous re-identification. An apparatus for re-identification comprises processing circuitry configured to obtain media data via an interface. the processing circuitry is configured to generate a re-identification code representing at least a portion of the media data using a hashing algorithm. The processing circuitry is configured to transform the re-identification code using a transformation functionality to obtain a transformed re-identification code. The transformation functionality is configured to transform the re-identification code such that, if the re-identification code is similar to a further re-identification code generated by the hashing algorithm according to a similarity metric, the transformed re-identification code is similar to a further transformed re-identification code being a transformed version of the further re-identification code.

(Continued)

The transformation functionality is configured to transform the re-identification code based on a transformation parameter, with the transformation parameter being dependent on a time and/or a location. The processing circuitry is configured to provide the transformed re-identification code.

14 Claims, 5 Drawing Sheets

(51) Int. Cl.
  *G06F 18/22* (2023.01)
  *G06F 21/60* (2013.01)
  *G06V 10/48* (2022.01)
  *G06V 10/74* (2022.01)
  *G06V 10/774* (2022.01)
  *G06V 20/40* (2022.01)
  *G06V 20/52* (2022.01)

(52) U.S. Cl.
  CPC .............. *G06V 10/48* (2022.01); *G06V 10/74* (2022.01); *G06V 10/774* (2022.01); *G06V 20/40* (2022.01); *G06V 20/52* (2022.01)

(58) Field of Classification Search
  CPC .......... G06T 9/00; G06V 10/48; G06V 10/74; G06V 10/774; G06V 20/40; G06V 20/52; G06V 10/764; H04L 9/0643; H04L 9/0662; H04L 9/0872; H04L 9/0894; H04W 12/02; H04W 12/00; G06N 20/00; G06N 3/02
  See application file for complete search history.

(56) References Cited

U.S. PATENT DOCUMENTS

| | | | |
|---|---|---|---|
| 9,396,412 B2 | 7/2016 | Kuo et al. | |
| 9,491,165 B2* | 11/2016 | Koneru | H04L 63/0853 |
| 10,176,405 B1 | 1/2019 | Zhou et al. | |
| 2009/0274344 A1* | 11/2009 | Bringer | G06V 40/12 382/284 |
| 2016/0148620 A1* | 5/2016 | Bilobrov | G10L 25/54 704/270 |
| 2018/0075300 A1 | 3/2018 | Mai et al. | |
| 2019/0289017 A1* | 9/2019 | Agarwal | H04L 9/12 |
| 2022/0092342 A1* | 3/2022 | Jakobsen | G06V 20/40 |
| 2022/0092343 A1* | 3/2022 | Jakobsen | G06V 10/48 |

OTHER PUBLICATIONS

Chen Jiaxin et al.: "Fast Person Re-Identification via Cross-Camera Semantic Binary Tansformation", 2017 IEEE Conference on Computer Vision and Pattern Recognition (CVPR), IEEE Computer Society, US, Jul. 21, 2017.

Borse Yogita et al.: "Geo-Encryption: A location based encryption technique for data security", 2019 5th International Conference on Computing, Communication, Control and Automation (Iccubea), IEEE, Sep. 19, 2019.

Liu Kai et al.: "Anchor-supported multi-modality hashing embedding for person re-identification", 2013 Visual Communications and Image Processing (VCIP), IEEE, Nov. 17, 2013.

Yang Xun et al.: "Person Reidentification via Structural Deep Metric Learning", IEEE Transactions on Neural Networks and Learning Systems, IEEE, Piscataway, NJ, USA, vol. 30, No. 10, Oct. 1, 2019.

Sang Liufang et al.: "MEIAH: Mixing explicit and implicit formulation of attributes in binary representation for person re- identification", Multimedia Tools and Applications, Kluwer Academic Publishers, Boston, US, vol. 78, No. 19, Jun. 24, 2019.

Mang Ye et al.: "Deep Learning for Person Re-identification: A Suvery and Outlook".

Masashi Nishiyama et al.: "Protecting Personal Information using Homomorphic Encryption for Person Re-identification".

"Anonymized person re-identification in surveillance cameras", Arthur Van Rooijen, et al. Proceedings of SPIE, Sep. 20, 2020, vol. 11542, pp. 115420, URL: https://doi.org/10.1117/12.2571943.

* cited by examiner

CONCEPT FOR ANONYMOUS RE-IDENTIFICATION

CROSS-REFERENCE TO RELATED APPLICATION

This application claims priority to European Application 20197542.2, filed on Sep. 22, 2020. The content of this earlier filed application is incorporated by reference herein in its entirety.

FIELD

Examples relate to a concept for anonymous re-identification (short form: re-id), more specifically, but not exclusively, to systems, apparatuses, methods and computer programs for performing anonymous re-identification and for training a machine-learning model for use in anonymous re-identification.

BACKGROUND

Visual person re-identification systems serve the purpose of distinguishing or re-identifying people, from their appearance alone, in contrast to identification systems that seek to establish the absolute identity of a person (usually from facial features). For example, the use of re-identification in a system may stem from the lack of a priori knowledge of the actual identity of all persons involved, but the use of re-identification may also be due to externally enforced privacy policies.

SUMMARY

Various examples of the present disclosure are based on the finding, that some re-identification systems may be retroactively abused if a given re-identification code is linked to an absolute identity of a person and that re-identification code remains the same across time and/or locations. Additional effort may thus be required to securely store and transmit the re-identification codes, e.g. using a strongly guarded and closed system, which may lead to additional implementation complexities, especially in systems with many cameras, where the re-identification codes are transmitted to a central server for re-identification. The re-identification codes may also be stored for purposes of future analysis. Accurate matching of persons can then be carried out using suitable graph theory-based algorithms like the Hungarian algorithm.

Other approaches usually do not integrate the handling of privacy issues or anonymization into the re-identification process itself. Rather, the distributed information may not be anonymous and therefore the above-mentioned additional effort may be required to handle the data securely at all times since it can potentially be used for (unwanted) identification. This constraint often leads to additional engineering efforts being made in order to keep the overall system secure and compliant.

Various examples of the present disclosure address these challenges by providing a concept for anonymous re-identification that is based on a privacy-by-design paradigm.

Various examples of the present disclosure relate to an apparatus for (anonymous) re-identification. The apparatus comprises processing circuitry configured to obtain media data via an interface. The processing circuitry is configured to generate a re-identification code representing at least a portion of the media data using a hashing algorithm. The processing circuitry is configured to transform the re-identification code using a transformation functionality to obtain a transformed re-identification code. The transformation functionality is configured to transform the re-identification code such that, if the re-identification code is similar to a further re-identification code generated by the hashing algorithm according to a similarity metric, the transformed re-identification code is similar to a further transformed re-identification code being a transformed version of the further re-identification code. The transformation functionality is configured to transform the re-identification code based on a transformation parameter, with the transformation parameter being dependent on a time and/or a location. The processing circuitry is configured to provide the transformed re-identification code. By transforming the re-identification code, the re-identification code can be altered sufficiently to thwart a tracking of persons across time and/or location, while maintaining the re-identification functionality for re-identification codes from the same time-frame or from the same location. Consequently, the resulting transformed re-identification codes become significantly less prone to retroactive identification, so they can be stored with a lower effort.

In various examples, the transformation parameter is dependent on a time. The processing circuitry may be configured to adapt the transformation parameter according to a pre-defined time schedule. By adapting (i.e. changing) the transformation parameter according to the predefined time-schedule, a tracking of a person over time may be made impossible.

For example, the processing circuitry may be configured to delete a previously used transformation parameter after adapting the transformation parameter. Without the transformation parameter, the original re-identification codes may not be recoverable.

In some examples, a gradual transition between transformation parameters is used. For example, the processing circuitry may be configured to generate two transformation parameters for two points in time. The processing circuitry may be configured to gradually adapt the transformation parameter based on a linear interpolation between the two transformation parameters in between the two points in time. Through the gradual adaptation, a matching of re-identification codes may only be possible across a sliding window of time.

In various examples, the transformation parameter is derived from a cryptographic secret. By using a cryptographic secret as a basis for the transformation parameter, recovery of the transformation parameter by a malicious actor may be thwarted. Also, the cryptographic secret may be used to drive a sequence of transformation parameters, such that the transformation parameters need not be distributed to devices using the apparatus.

The transformation functionality may be configured to perform a linear transformation of the re-identification code based on the transformation parameter. Linear transformations may provide a transformation of the re-identification code with a low implementation complexity.

In some implementations, the transformation functionality is configured to transform the re-identification code using a rotation matrix. The rotation matrix is based on the transformation parameter. For example, the entries of the rotation matrix may be based on pseudo-random numbers that are derived from the transformation parameter. A transformation that is based on a rotation matrix satisfies the so-called "equivalence class preserving" property required to maintain the re-identification functionality among transformed re-identification codes.

In some examples, instead of a linear transformation, a non-linear transformation may be chosen. In other words, the transformation functionality may be configured to perform a nonlinear transformation of the re-identification code. Non-linear transformations may provide an even higher level of security, albeit at the expense of implementation complexity and verifiability. For example, the transformation functionality may be configured to perform the non-linear transformation using a machine-learning model. In other words, the machine-learning model may be used to perform the non-linear transformation of the re-identification code.

Re-identification systems may be used with various types of media. Apart from image data of persons, re-identification systems may also be applied on images of vehicles or animals, or other types of media may be used altogether. For example, the media data may be one of image data, video data, audio data, a three-dimensional representation of movement of an object and text-based media data. These types of media can be used with a suitable re-identification system and hashing algorithm.

Various examples of the present disclosure may be used in video surveillance and/or tracking of persons, vehicles, animals etc. For example, the processing circuitry may be configured to obtain the media data from an imaging sensor of a camera. In this case, the media data may be one of image data and video data. For example, the apparatus may be co-located with the imaging sensor, or the media data may be provided to an apparatus that is used to generate and transform re-identification code for more than one camera. For example, various examples of the present disclosure provide a camera device comprising an imaging sensor and the apparatus.

As mentioned above, in some examples, the apparatus may be used with more than one camera, or more general, with more than one media data generation device. In this case, the apparatus may be accessible via a (computer) network, and be used to generate and transform re-identification code for more than one media data generation device. In other words, the processing circuitry may be configured to obtain the media data from one or more media data generation devices via a network.

As has been pointed out above, the transformation parameter can be dependent on a location of a device. If a network-based apparatus is being used with media data generation devices that are located at different locations, accordingly, different transformation parameters may be used. In other words, the processing circuitry may be configured to obtain the media data from two or more media data generation devices being located at different locations. The processing circuitry may be configured to perform the transformation using different transformation parameters for the two or more media data generation devices being located at different locations. Consequently, the objects being characterized by transformed re-identification codes might not be traceable across locations (depending on the configuration of the transformation parameters).

Similar to the time-based gradual adaptation of transformation parameters, the gradual adaptation can also be performed gradually between locations, e.g. to enable re-identification between images from adjacently located cameras, but not cameras that are located further away. For example, the processing circuitry may be configured to obtain the media data from a first, a second and a third media data generation device (e.g. camera) being located at different locations, with the second media data generation device being located between the first and the third media data generation device. The processing circuitry may be configured to generate the transformation parameter for the media data obtained from the second media data generation device based on a linear interpolation between transformation parameters used for the media data obtained from the first and third media data generation devices. In consequence, re-identification might be possible between transformed re-identification codes of the first and second media data generation device, and between transformed re-identification codes of the second and third media data generation device, but not between transformed re-identification codes of the first and third media data generation device.

In various examples, the processing circuitry is configured to provide the transformed re-identification code to a database, e.g. a database that is accessible by multiple devices via a defined interface. For example, multiple apparatuses may be configured to provide their generated transformed re-identification codes to the database. For example, the actual re-identification may be performed by an evaluation device having access to the database.

The processing circuitry may be configured to use a machine-learning model to generate the re-identification code. There are a variety of frameworks for generating re-identification codes using machine-learning techniques.

In general, the transformation functionality may be configured to transform the re-identification code such, that a level of similarity between the re-identification code and the further re-identification code is equivalent to a level of similarity between the transformed re-identification code and the further transformed re-identification code, with the level of similarity being based on the similarity metric. In other words, the transformation may be performed such, that a subsequent re-identification is not skewed, and the equivalence class preserving property is satisfied.

Various examples of the present disclosure relate to a corresponding method for re-identification. The method comprises obtaining media data (e.g. via an interface). The method comprises generating a re-identification code representing at least a portion of the media data using a hashing algorithm. The method comprises transforming the re-identification code using a transformation functionality to obtain a transformed re-identification code. The transformation functionality transforms the re-identification code such that, if the re-identification code is similar to a further re-identification code generated by the hashing algorithm according to a similarity metric, the transformed re-identification code is similar to a further transformed re-identification code being a transformed version of the further re-identification code. The transformation functionality transforms the re-identification code based on a transformation parameter. The transformation parameter is dependent on a time and/or a location. The method comprises providing the transformed re-identification code (e.g. via the interface).

In some implementations, a time-based or location-based adaptation of the transformation parameter may be foregone, e.g. in a closed system. In this case, the following apparatus for generating a transformed re-identification code may be used. In general, said apparatus may share one or more features with the previously presented apparatus. The apparatus comprises processing circuitry configured to obtain media data via an interface. The processing circuitry is configured to generate a re-identification code representing at least a portion of the media data using a hashing algorithm. The processing circuitry is configured to transform the re-identification code using a similarity-preserving transformation functionality to obtain the transformed re-identification code. The processing circuitry is configured to provide the transformed re-identification code.

Examples further provide a corresponding method for generating a transformed re-identification code. The method comprises obtaining media data (e.g. via an interface). The method comprises generating a re-identification code representing at least a portion of the media data using a hashing algorithm. The method comprises transforming the re-identification code using a similarity-preserving transformation functionality to obtain the transformed re-identification code. The method comprises providing the transformed re-identification code (e.g. via the interface).

Various examples of the present disclosure further provide a system comprising two or more apparatuses for re-identification or two or more apparatuses for generating a transformed re-identification code. The time- or location-based transformation factors become increasingly relevant when dealing with two or more apparatuses.

As has been mentioned above, the transformation parameter may be dependent on a time. For example, the two or more apparatuses may be configured to use the same transformation parameter at the same time. By using the same transformation parameter at the same time, re-identification can be performed across the transformed re-identification code of the two or more apparatuses, albeit (only) for transformed re-identification codes being generated at the same time.

In some other examples, the transformation parameter may be dependent on a location. The two or more apparatuses may be configured to process media data originating from two or more locations, and to use different transformation parameters for the media data originating from the two or more locations. Accordingly, re-identification across different locations may be purposefully limited.

Various examples of the present disclosure provide a system comprising at least one apparatus for re-identification or at least one apparatus for generating a transformed re-identification code and an evaluation device. The evaluation device is configured to obtain transformed re-identification codes from the at least one apparatus, and to compare the transformed re-identification codes provided by the at least one apparatus according to the similarity metric. Accordingly, the re-identification that is based on the transformed re-identification codes can be performed by a separate entity.

As has been mentioned above, in some cases, a non-linear transformation can be used to transform the re-identification codes, which may be based on a machine-learning model. In the following, a method and apparatus for training such a machine-learning model is presented. The method comprises obtaining training data for training the machine-learning model. The training data comprises at least a plurality of re-identification codes. The method comprises training the machine-learning model using the training data. The machine-learning model is trained to non-linearly transform the plurality of re-identification codes into a plurality of transformed re-identification codes such, that if a re-identification code is similar to a further re-identification code according to a similarity metric, the transformed re-identification code is similar to a further transformed re-identification code being a transformed version of the further re-identification code.

The corresponding apparatus for training a machine-learning model comprises processing circuitry being configured to obtain training data for training the machine-learning model. The training data comprises at least a plurality of re-identification codes. The processing circuitry is configured to train the machine-learning model using the training data. The machine-learning model is trained to non-linearly transform the plurality of re-identification codes into a plurality of transformed re-identification codes such, that if a re-identification code is similar to a further re-identification code according to a similarity metric, the transformed re-identification code is similar to a further transformed re-identification code being a transformed version of the further re-identification code.

In some cases, both for the transformation and for the generation of the (original) re-identification code, machine-learning models may be employed. It may be beneficial to jointly train both machine-learning models. In other words, the plurality of identification codes may be generated based on media data using a further machine-learning model. The processing circuitry may be configured to jointly train the machine-learning model and the further machine-learning model.

Examples of the present disclosure further provide a computer program having a program code for performing at least one of the above-presented methods, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
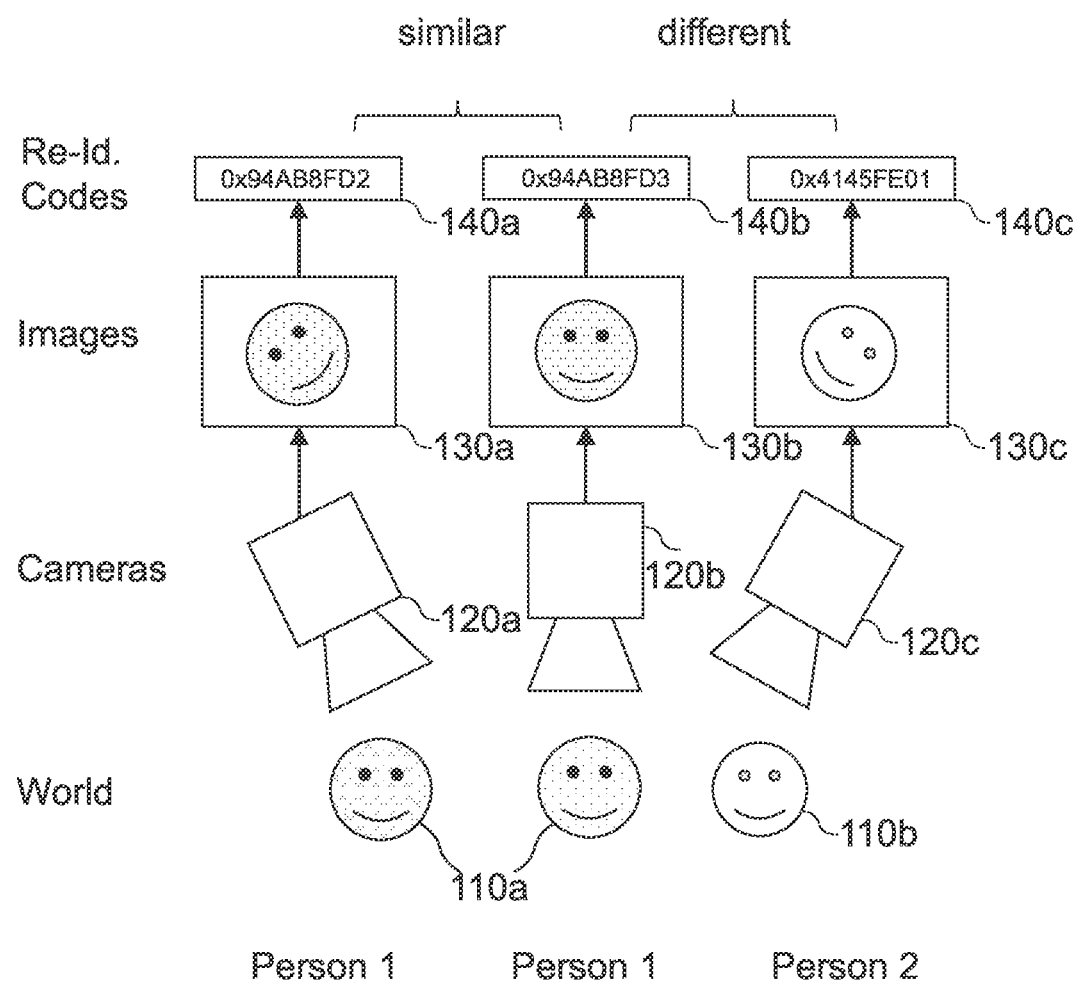
FIG. 1 shows a schematic illustration of a re-identification system.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various aspects of the present disclosure relate to a method, apparatus, system and computer program for anonymous re-identification.

In the following, an example laying out a basic principle of re-identification is given. In the example, two surveillance cameras are being used. From these cameras, two images are obtained, each with a single person visible. The images may have been acquired from different angles and under different lighting conditions (or even from the same camera but at different points in time). Re-identification systems seek to infer whether the two images depict the same person or whether the images in fact show two different persons—even without knowledge of any actual identities. Furthermore, re-identification is not limited to the detection of persons in images—for example, re-identification may be performed on animals or objects, and using other types of media as well, such as three-dimensional models, text or audio.

FIG. 1 shows a schematic illustration of the different components of an exemplary re-identification system without a transformation component. Three cameras 120a; 120b; and 120c are used to record two persons 110a; 110b, with cameras 120a and 120b recording the same person 110a. The resulting images 130a; 130b; 130c are taken from different angles. Based on the images, re-identification codes 140a; 140b; 140c are generated, with re-identification codes 140a; 140b being similar, as images 130a; 130b depict the same person, and re-identification code 140c being dissimilar (i.e. different) from the other re-identification codes 140a; 140b. In other words, the re-identification codes 140a; 140b for the two first images 130a; 130b (which feature the same person from different angles) are similar whereas the codes 140b; 140c for the two final images 130b; 130c are different (since the images are of two different persons).

There are multiple use cases where re-identification may be used instead of systems establishing an absolute identity, e.g., for filtering duplicate detections when counting unique visitors at a particular location during a single day, for estimating the time of travel between two distinct locations using a sensor at each endpoint, calculating the time of stay of customers at a single location, wide-area people tracking using non-overlapping cameras etc.

In some systems, re-identification is implemented by applying a hash function to each image in order to produce a so-called re-identification code. The generated hash codes represent the persons, animals or objects that are visible within the respective images, and may be compared using a similarity metric.

Various examples of the present disclosure extend the concept of re-identification codes by adding an "encryption layer" on top of the re-identification codes to generate transformed re-identification codes. The applied hash function, together with the transformation, has a so-called "equivalence class preserving" (ECP) property, which can also be an isometry property or an "(almost) distance-preserving" property, as the distance between transformed re-identification codes is at least similar, if not equal, to the distance between the re-identification codes that the transformed re-identification codes are based on. The ECP property is similar to properties of locality-sensitive hashing (LSH), and is described in the following.

In mathematical terms, let f be such a hash function, e an ECP-preserving transformation function (encryption function), and let $h_1=e(f(I_1))$ and $h_2=e(f(I_2))$ be the respective re-identification codes of the two images $I_1$ and $I_2$. The ECP property assures that two transformed re-identification codes are approximately similar in some suitable similarity metric, i.e., $h_1 \approx h_2$, if and only if the person on image $I_1$ is the same as the person on image $I_2$—even if the images are captured from different angles. Therefore, after evaluating the hash function on the two images, if the distance between the two re-identification codes is small, it can be concluded that the person is the same. If on the other hand, the distance is large, then, most likely, the images contain persons that are different.

Various methods can be used to implement such a system for visual re-identification. A number of systems use hand-crafted visual features (like gender, age, facial features, color of clothing, hair style, body type etc.), but in order to gain the highest accuracy possible, many approaches rely on deep learning-based techniques based on, e.g. triplet loss. The exact method used for computing the re-identification code, however, is not important for the sake of explaining the concept.

In some systems, the re-id code (short form of re-identification code) for a specific person may be identical for different days leading to potential absolute identification of individual persons. This may be due to the fact that traditional re-identification codes are consistent over time. For example, if a person has his image taken on one particular camera at a particular time $t_1$, then it may be possible to identify him at a much later time $t_2$, potentially leading to knowledge about their personal identity one of the images may have been obtained, e.g., from their passport or driving license. If re-identification is applied in such a manner, it may thus inadvertently also enable non-anonymous identification of persons. In many systems, this identification property is unwanted as it can lead to data leakage. It is not possible to use straight-forward cryptographic methods to alleviate this shortcoming by, e.g., encrypting re-identification codes without losing the required re-identification ability. Because individual devices relying on previous approaches might not offer privacy by design, such distributed systems for re-identification might keep all communication secret and store re-identification values securely, e.g. by using secure devices or communicating over secure networks. In distributed multi-camera systems with many devices communicating, this may add an additional burden to the overall system design. Furthermore, the problem might not be alleviated with traditional cryptographical methods, as almost all existing encryption methods lack the "equivalence class preserving" property due to the cryptographic avalanche effect, whereby small changes in the unencrypted data lead to large changes in the encrypted data and therefore might not maintain the re-identification ability. In other words, some methods for re-identification might not offer privacy by design.

Various examples of the present disclosure take a different approach, in which a re-identification over multiple locations or over time is restricted by design. Examples may provide a method for anonymous re-identification and therefore allow privacy by design (by periodically or locally, efficiently and irreversibly changing the re-identification hash function). This may enable both transmitting and storing re-identification codes insecurely without violating privacy regulations, as the privacy may be conserved even if the transformed codes are stored in arbitrary storage systems without guarantees regarding privacy. The proposed concept is based on augmenting an existing (non-privacy enhanced, non-anonymous, commonly used) re-identification hash function with a transformation functionality, e.g. using additional specialized, cryptographic primitives. In contrast to traditional cryptographic schemes for secrecy, the proposed concept does not remove the ability to carry out re-identification even after encrypting the re-identification code (by maintaining the ECP property). In contrast to some other systems, the re-identification code matching can be carried out on an insecure server or even by an untrusted third party. Also, transformed re-identification codes can be stored indefinitely in untrusted databases, without sacrificing on privacy. The proposed concept may improve the concept of re-identification, as it allows existing re-identification algorithms to be enhanced with privacy by design by adding new additional primitives on top. The proposed concept may combine an existing or novel re-identification system with a (dynamic) encryption primitive (i.e. a transformation function) with the ECP property (on top of the re-identification system).

In the following, it is assumed that the system for computing and subsequently encrypting the re-identification codes is embedded into the cameras. This is not necessary for the proposed concept to work, but is useful for illustrating the use case. While the method may be useful on embedded or edge devices, it can also work on cloud-based implementations, with the subsequently presented apparatus or evaluation device being implemented in the cloud.

Figure 2A:
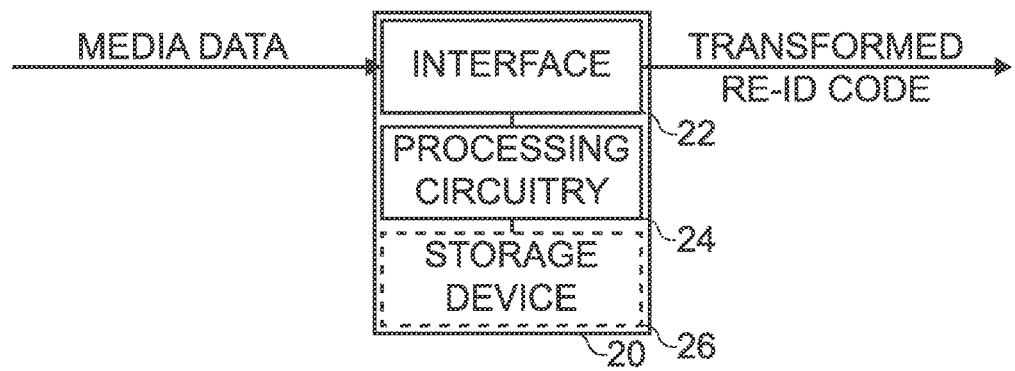
FIGS. 2a and 2b show schematic block diagrams of examples of an apparatus for re-identification or an apparatus for generating a transformed re-identification code.
Figure 2B:
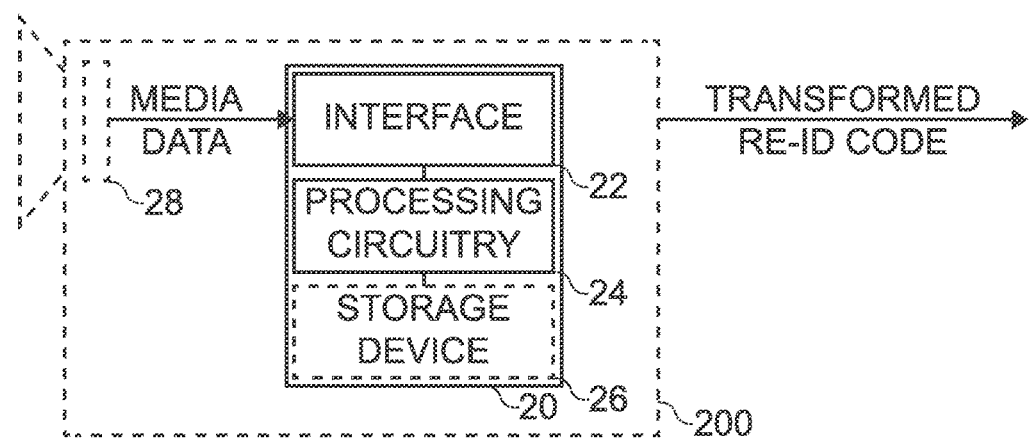

FIGS. 2a and 2b show schematic block diagrams of examples of an apparatus 20 for re-identification or of an apparatus 20 for generating a transformed re-identification code. The apparatus comprises an interface 22 and processing circuitry 24. Optionally, the apparatus comprises one or more storage devices 26. The processing circuitry is coupled to the interface and to the optional one or more storage devices. In general, the functionality of the apparatus is provided by the processing circuitry, e.g. in conjunction with the interface (for exchanging information) and/or the one or more storage devices (for storing information).

The processing circuitry 24 is configured to obtain media data via an interface 22. The processing circuitry is configured to generate a re-identification code representing at least a portion of the media data using a hashing algorithm. The processing circuitry is configured to transform the re-identification code using a transformation functionality to obtain a transformed re-identification code. The transformation functionality is configured to transform the re-identification code such that, if the re-identification code is similar to a further re-identification code generated by the hashing algorithm according to a similarity metric, the transformed re-identification code is similar to a further transformed re-identification code being a transformed version of the further re-identification code. The transformation functionality is configured to transform the re-identification code based on a transformation parameter. For example, the transformation parameter is dependent on a time and/or a location. The processing circuitry is configured to provide the transformed re-identification code (e.g. via the interface 22). FIG. 2b further shows a camera device 200 comprising the apparatus 22. For example, the camera device 200 may further comprise an imaging sensor for generating the media data, e.g. as image data.

Figure 2C:
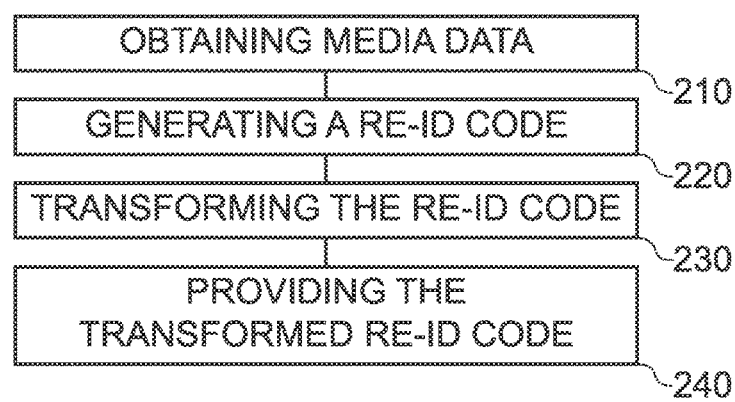
FIGS. 2c and 2d show flow charts of examples of a method for re-identification or of a method for generating a transformed re-identification code.
Figure 2D:
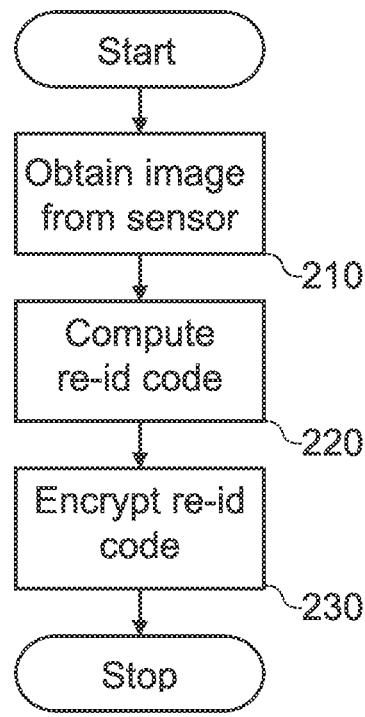

FIGS. 2c and 2d show flow charts of examples of a corresponding method for re-identification or of a method for generating a transformed re-identification code. In general, the method may cover the functionality of the apparatus of FIGS. 2a and/or 2b. Accordingly, features introduced in connection with the apparatus may be likewise applied to the corresponding method (and vice versa). The method comprises obtaining 210 the media data (e.g. via an interface), e.g. by obtaining an image from a sensor. The method comprises generating (i.e. computing) 220 the re-identification code representing at least a portion of the media data using a hashing algorithm. The method comprises transforming (i.e. encrypting) 230 the re-identification code using the transformation functionality to obtain the transformed re-identification code. The transformation functionality transforms the re-identification code such that, if the re-identification code is similar to a further re-identification code generated by the hashing algorithm according to a similarity metric, the transformed re-identification code is similar to a further transformed re-identification code being a transformed version of the further re-identification code. The transformation functionality transforms the re-identification code based on a transformation parameter. For example, the transformation parameter is dependent on a time and/or a location. The method comprises providing 240 the transformed re-identification code.

The following description relates both to the apparatus 20 or camera device 200 of FIGS. 2a and/or 2b, and to the corresponding method of FIGS. 2c and/or 2d.

Various aspects of the present disclosure relate to an apparatus, method and computer program for re-identification, i.e. an apparatus for generating re-identification codes for use in a re-identification system. In contrast to various other systems, the present apparatus, method and computer program build upon the general concept of re-identification, adding a transformation layer that retains the ability for re-identification while thwarting the ability to retroactively track persons or objects across time or across different locations. For example, by transforming the re-identification code, the re-identification code may be encrypted by the transformation functionality. Various aspects of the present disclosure thus relate to an apparatus, method and computer program for anonymous re-identification.

The proposed concept addresses this issue by adding on top of an existing re-identification function a dynamically changing encryption layer (i.e. a transformation function) that maintains the ECP property. Put differently, the proposed concept allows construction of re-identification codes with built-in time intervals (or location restrictions) outside which they purposefully do not function. This approach results in an anonymous re-identification and privacy-by-design, so re-identification values may be transferred even to insecure devices or over insecure networks and the re-identification code matching process may take place at a later point in time by an untrusted server or even third party. In general, the proposed concept is based on (dynamically) changing the re-identification scheme in an efficient way, e.g. every day or across locations, so that re-identification codes are not consistent between different days and/or locations while still preserving their consistency during each individual day or within each location.

In general, the anonymous re-identification is implemented using at least two novel aspects—a transformation of re-identification codes that preserves the equivalence class preserving property, and a dependency of the transformation on a time or on a location. The first aspect is aimed at retaining the re-identification functionality only between transformed re-identification codes that originate from the same (or similar) transformation parameter, and the second aspect is aimed at specifying the circumstances, in which different transformation parameters are being used. For example, if different transformation parameters are being used for different times, a tracking of a person across the different times may be thwarted. Similarly, if different transformation parameters are being used for different locations, a tracking of a person across the different locations may be thwarted. In consequence, the resulting transformed re-identification codes may be stored and/or transmitted over potentially insecure systems, reducing an implementation effort required.

The re-identification code is generated based on media data. In general, the media data may be visual, audio, or audio-visual media data. For example, the media data may be one of image data, video data, audio data, a three-dimensional representation of movement of an object (i.e. three-dimensional body movement) and text-based media data/input. The media data may accordingly originate from various types of media data generation devices, such as cameras or camera sensors, microphones, three-dimensional scanners or text acquisition systems.

The processing circuitry may be configured to obtain the media data from one or more media data generation device, e.g. locally or via a (computer network). Accordingly, the interface 22 may be or comprise a local interface for intra-device communication, or the interface 22 may be or comprise an interface for communicating via a computer network, such as the internet or a local network. For example, in some cases, the apparatus may be used to generate re-identification code for media data from more than one media data generation device, with the media data generation devices being located at different locations. Accordingly, the media data may be obtained, or may originate, from two or more media data generation devices being located at different locations.

For example, as has been mentioned above, the apparatus may be part of a camera device 200 comprising a camera sensor 28. This case, the media data generation device may be the camera device or the camera sensor 28 of the camera device, and the processing circuitry may obtain the media data from the camera sensor 28. In some cases, however, the apparatus may be external to the camera device, with the processing circuitry being configured to obtain the media data from the camera that is external to the apparatus. For example, the apparatus may be implemented in network device, an edge device (i.e. a network device being located in close proximity to the media data generation devices), or a cloud server. In both cases, in general terms, the processing circuitry is configured to obtain the media data from an imaging sensor of a camera, with the media data being one of image data and video data.

Depending on the type of the media data, a suitable hashing algorithm may be chosen to generate the re-identification code. The processing circuitry is configured to generate the re-identification code representing at least a portion of the media data using the hashing algorithm, with the hashing algorithm being suitable for the media data at hand. The proposed system can also be used beyond people re-identification. For example, the proposed concept may be applied to bicyclists, cars, luggage and other objects or animals. For example, Ye et al: "Deep Learning for Person Re-identification: A Survey and Outlook" (2020) provides examples for hashing algorithms for re-identification that are based on deep learning. Accordingly, the processing circuitry may be configured to use a machine-learning model, e.g. a deep learning network, to generate the re-identification code. Instead of using a previously used re-identification system, newer techniques may also be employed, or the re-identification system may be improved to work with the (dynamic) encryption primitive.

There are various types of re-identification codes. In the following, the given examples assume a hash-value based re-identification code. In particular, examples are given, where the re-identification code is a vector comprising 128 values. However, other types of re-identification codes may be used as well, with a suitable adaption of the transformation functionality.

The re-identification code represents at least a portion of the media data. For example, the re-identification code may represent an object or person represented by the media data. Accordingly, the transformed re-identification code may represent the object or person represented by the media data To carry out the above-mentioned process without periodically having to reconstruct the entire basic re-identification system, which would be a highly laborious process, an extra layer, i.e. the transformation function, is added on top of an existing re-identification system. Accordingly, the processing circuitry is configured to transform the re-identification code (that is generated using an existing or novel re-identification system/algorithm) using a transformation functionality to obtain the transformed re-identification code. The additional layer of the transformation functionality may, for example, be a key-dependent dynamic encryption primitive with the ECP property, which allows the re-identification property to be maintained in spite of re-identification codes being encrypted (in contrast to classical encryption schemes, as mentioned, which lose the re-identification property).

In mathematical terms, f denotes an existing (traditional) re-identification system, that is used to generate the re-identification code. According to a pre-defined schedule, e.g. every day, or per location, a new secret key k is distributed to all devices (using, e.g., a traditional public key infrastructure). For example, the secret key k may be the transformation parameter, or k may be a cryptographic secret the transformation parameter is derived from. Let $e_k$ be a cryptographically secure, bijective transformation function with the ECP property, which is dependent on the shared secret key k. The final anonymous, dynamic re-identification function, $c_k$, which is proposed and which operates on the image I, is then given by the composition of the dynamic encryption layer $e_k$ and the existing re-identification function, $f$, i.e., $c_k(I)=e_k(f(I))$.

In the following, the assumption is made that the secret key is changed every day, i.e. that the transformation function is based on time. Let $k_{t-1}$ denote the secret key from yesterday and let $k_t$ denote the secret key from today. Every day, all devices may make sure that the key from yesterday $k_{t-1}$ and thus the corresponding encryption function is securely destroyed (e.g. by overwriting the relevant memory and storage areas). Because keys are changed every day, it may be impossible to compare re-identification codes from yesterday with the re-identification codes from today. In other words, the following anonymous re-identification property is satisfied:

$ck_t(I_1) \approx ck_t(I_2)$ and $ck_{t+1}(I_1) \approx ck_{t+1}(I_2)$ but $ck_t(I_1) \neq ck_{t+1}(I_2)$ and $ck_t(I_2) \neq ck_{t+1}(I_1)$.

In other words, the similarity-preserving or equivalence class preserving property is satisfied. Hence, the transformation functionality is configured to transform the re-identification code such that, if the re-identification code is similar to a further re-identification code generated by the hashing algorithm according to the similarity metric, the transformed re-identification code is similar to a further transformed re-identification code being a transformed version of the further re-identification code. On the other hand, if the re-identification code is dissimilar to the further re-identification code generated by the hashing algorithm according to the similarity metric, the transformed re-identification code should be, or rather is, dissimilar to the further transformed re-identification code. In more general terms, the transformation functionality may be configured to transform the re-identification code such, that a level of similarity between the re-identification code and the further re-identification code is equivalent to a level of similarity between the transformed re-identification code and the further transformed re-identification code, with the level of similarity being based on the similarity metric. For example, if the level of similarity is high, the two re-identification codes and the two transformed re-identification codes may be similar, respectively, and if the level similarity is low, the two re-identification codes and the two transformed re-identification codes may be dissimilar, respectively.

In various examples, the transformation function can be used to linearly transform the re-identification code. In other words, the transformation functionality may be configured to perform a linear transformation of the re-identification code based on the transformation parameter. One specific implementation of a linear transformation is a transformation that is based on a rotation matrix. In other words, the transformation functionality may be configured to transform the re-identification code using a rotation matrix, with the rotation matrix being based on the transformation parameter. In general, a rotation matrix is a matrix that is used to perform a rotation (e.g. of a vector) in a given coordinate space, by multiplying the vector with the rotation matrix.

In the following, a specific construction of a dynamical encryption function with the ECP property is introduced. It may be assumed for simplicity in the following that the original re-identification code h is a vector of 128 floating point values each from the interval −1 to +1. In general, the assumptions of using 128-dimensional vectors with float-based components can be changed to any dimension and other numerical domains, e.g., integer or Boolean values. As encryption function being used for the transformation functionality, $e_k$ is chosen, the function given by $e_k(h) = R_k \times h$, where $R_k$ is a 128-128 random rotation matrix irreversibly dependent on the key k and where the operation × denotes the matrix product. Because rotations are distance preserving, the resulting function still has the ECP property required to keep the re-identification process working. $R_k$ can be generated in a cryptographically secure way by initializing a secure random number generator using k, and subsequently sampling a random 128D rotation matrix (e.g., by sampling individual matrix components from the normal distribution using a cryptographically secure random number generator and subsequently normalizing the matrix by carrying out a Gram-Schmidt orthogonalization). In other words, the entries of the rotation matrix may be based on pseudo-random numbers that are derived from the transformation parameter, for example from a cryptographic secret of the transformation parameter. Subsequently, the generated pseudo-random numbers of the matrix may be normalized using Gram-Schmidt orthogonalization. For example, the processing circuitry may be configured to generate the rotation matrix based on the transformation parameter, by generating the pseudo-random numbers and normalizing the resulting matrix. Because of the high number of free parameters in the encryption operator matrix and because of the cryptographically strong construction process, using even a linear operator like $R_k$ can provide sufficient security in most plausible attack scenarios.

Alternatively, the transformation functionality may be configured to perform a non-linear transformation of the re-identification code. For example, instead of a matrix multiplication, a more complex hash function may be employed. In some implementations, deep learning may be employed to create a more complex, more non-linear function (while still maintaining the equivalence class preserving property). In other words, the transformation functionality may be configured to perform the non-linear transformation using a machine-learning model.

For example, the machine-learning model may take the re-identification code and the transformation parameter as an input, and provide the transformed re-identification code at an output. The training of a suitable machine-learning model is described in more detail in connection with FIGS. 4a and 4b. Furthermore, end-to-end training of the combined deep network (the underlying re-identification system combined with the dynamic encryption scheme) may be used to enable higher robustness and precision.

In general, to thwart tracking of persons or objects over time and/or location, the transformation parameter, and therefore the transformation itself, is dependent on time and/or location. In general, the time may refer to the time the transformation of the re-identification code is performed, which may also be the time the media data is obtained, as the apparatus may be used for near-instantaneous generation and transformation of the re-identification code. In some cases, the two instances of time may be uncoupled, e.g. the transformation may be applied retroactively on previously generated media data. On the other hand, the location may relate to a location the media originates from (e.g. in a system where one apparatus is used to generate transformed re-identification codes for media data from different media data generation devices located at different locations), or to a location of the apparatus itself, e.g. if the media data of different media data generation devices is to be processed using the same transformation parameter, or of the apparatus is co-located with the media data generation device.

In the following, an implementation of a transformation parameter that is dependent on the time is introduced, followed by an introduction of a transformation parameter that is dependent on location.

Various examples of the present disclosure may use a transformation parameter that changes over time, e.g. in order to avoid re-identification, and therefore the danger of absolute identification, across days. Accordingly, the transformation parameter may be adapted based on a time schedule, in order to apply a new or adapted transformation parameter over time. In other words, the processing circuitry may be configured to adapt the transformation parameter according to a pre-defined time schedule. For example, the processing circuitry may be configured to adapt the transformation parameter every day, or every half-day, or every week, depending on the desired level of privacy. For example, the processing circuitry may be configured to generate, or select, a new transformation parameter according to the pre-defined time schedule. After adapting the transformation parameter, the previously used parameter may be discarded, or rather deleted, in order to thwart a retroactive re-generation of the transformed re-identification codes. In other words, the processing circuitry may be configured to delete a previously used transformation parameter after adapting the transformation parameter. For example, if transformation parameters, or the underlying cryptographic keys, are periodically destroyed, it may not be possible either to obtain the original re-identification codes from prior days even in the event that a device happens to be compromised at some point in time. The resulting transformed re-identification codes can therefore freely be shared with anyone without compromising the identify of anyone thus providing anonymous re-identification codes.

In some examples, incremental/differential key changes may be employed in the transformation function. For example, if the transformation function depends on time, this would result in a sliding temporal window of anonymization instead of the current fixed window from, e.g., midnight to midnight. In other words, the processing circuitry may be configured to generate two transformation parameters for two points in time (e.g. midnight at two days). These two transformation parameters may be sufficiently different to disable tracking of persons or objects across the two transformation parameters. The processing circuitry may be configured to gradually adapt the transformation parameter based on a linear interpolation between the two transformation parameters in between the two points in time. In other words, between the two points in time, the transformation parameter being used for transforming the re-identification code may be gradually adapted based on a linear interpolation from a first of the two transformation parameters to a second of the two transformation parameters. Taken the rotation matrix as an example, a first and a second rotation matrix each having a plurality of elements may be generated. Using linear interpolation, a third rotation matrix may be generated, wherein each element of the third matrix is based on a linear interpolation between the respective elements of the first and second matrix. Subsequently, the third matrix may be normalized.

Similarly, incremental/differential key changes may be used across various locations of an area. The further apart the locations within the area are, the less similar the resulting re-identification codes may be. For example, as introduced above, the processing circuitry may be configured to obtain the media data from two or more media data generation devices being located at different locations. In general, the processing circuitry may be configured to perform the transformation using different transformation parameters for the two or more media data generation devices being located at different locations, e.g. in order to disable re-identification between transformed re-identification codes being generated for the media data originating from the two locations. A third media data generation device, however, may be located between the two media data generation devices. The transformation parameter for this third media data generation device may be chosen such, that re-identification is possible vis-à-vis transformed re-identification codes that are generated for media data originating from the first two locations. In other words, the processing circuitry may be configured to obtain the media data from a first, a second and a third media data generation device being located at different locations, with the second media data generation device being located between the first and the third media data generation device. Similar to the example with the gradual adaptation over time, the processing circuitry may be configured to generate the transformation parameter for the media data obtained from the second media data generation device based on a linear interpolation between transformation parameters used for the media data obtained from the first and third media data generation devices. As a result, re-identification may be possible between transformed re-identification codes generated based on media data originating from the first and the second media data generation device, and between transformed re-identification codes generated based on media data originating from the second and the third media data generation device, but not between transformed re-identification codes generated based on media data originating from the first and the third media data generation device. In various examples, an even more finegranular system may be used, where the two transformation parameters are generated for two arbitrary locations located at either side of a group of media data generation devices, and the transformation parameters of the media data generation devices are generated based on a location-based linear interpolation between the two transformation parameters.

In general, there are various options for obtaining the suitable transformation parameters. For example, the transformation parameters may be generated on-device, i.e. by the processing circuitry, based on a cryptographic secret, which may be shared among apparatuses being configured to generate the same transformation parameters (e.g. dependent on time). In other words, the transformation parameter may be derived from a cryptographic secret. Accordingly, the processing circuitry may be configured to generate the transformation parameter, e.g. the rotation matrix, or an input parameter for the machine-learning model being employed by the transformation functionality, based on the cryptographic secret and based on the time and/or the location. For example, the cryptographic secret may be used, together with the time and/or location, to generate a seed for generating pseudo-random numbers for the transformation parameter. For example, a cryptographically strong method may be used for constructing new keys (i.e. transformation parameters) or encryption methods from a single shared secret. Irreversible key generation may be used for heightened security. For example, in some examples, irreversible, shared, dynamic transformation parameters (i.e. key values) may be used without a persistent network connection. After sharing an initial secret seed, the following method may be applied: $k_t = AES(k_{t-1}, k_{t-1})$, where the operation $AES(x, k)$ applies the Advanced Encryption Standard to the text x using the key (i.e. cryptographic secret) k, i.e., to obtain today's key, $k_t$, yesterday's key, $k_{t-1}$, may be encrypted with itself and subsequently destroyed.

Finally, the processing circuitry is configured to provide the transformed re-identification code, e.g. via the interface 22. In general, the processing circuitry may be provided by storing the re-identification code, e.g. using the one or more storage devices, or using a database, e.g. a database that is accessible by multiple devices via a defined interface (e.g. via a computer network and/or according to a pre-defined protocol), and/or that is external to the apparatus and/or the camera device. In other words, the processing circuitry may be configured to provide the transformed re-identification code to a database. For example, the transformed re-identification code may be processed by an evaluation device that has access to the database.

The proposed concept may provide a combination of computer vision and cryptography. Specifically, privacy-enhanced visual person re-identification may be provided, using secure video analysis on distributed, embedded camera-based systems.

The interface 22 may correspond to one or more inputs and/or outputs for receiving and/or transmitting information, which may be in digital (bit) values according to a specified code, within a module, between modules or between modules of different entities. For example, the interface 22 may comprise interface circuitry configured to receive and/or transmit information. For example, the interface 22 may be suitable for communication within the camera device 200. Additionally or alternatively, the interface 22 may be suitable for communicating via a computer network, e.g. via a wireless or wired computer network.

The processing circuitry 24 may be implemented using one or more processing units, one or more processing devices, any means for processing, such as a processor, a computer or a programmable hardware component being operable with accordingly adapted software. In other words, the described function of the processing circuitry 24 may as well be implemented in software, which is then executed on one or more programmable hardware components. Such hardware components may comprise a general-purpose processor, such as a Central Processing Unit (CPU) a Digital Signal Processor (DSP), a micro-controller, etc.

In at least some embodiments, the one or more storage devices 26 may comprise at least one element of the group of a computer readable storage medium, such as an magnetic or optical storage medium, e.g. a hard disk drive, a flash memory, Floppy-Disk, Random Access Memory (RAM), a Read Only Memory (ROM), Programmable Read Only Memory (PROM), Erasable Programmable Read Only Memory (EPROM), an Electronically Erasable Programmable Read Only Memory (EEPROM), or a network storage.

More details and aspects of the camera device or of the method, apparatus and computer program introduced in connection with FIGS. 2a to 2d are mentioned in connection with the proposed concept or one or more examples described above or below (e.g. FIGS. 1a and 3a to 4b). The camera device and the method, apparatus and computer program may comprise one or more additional optional features corresponding to one or more aspects of the proposed concept or one or more examples described above or below.

Figure 3A:
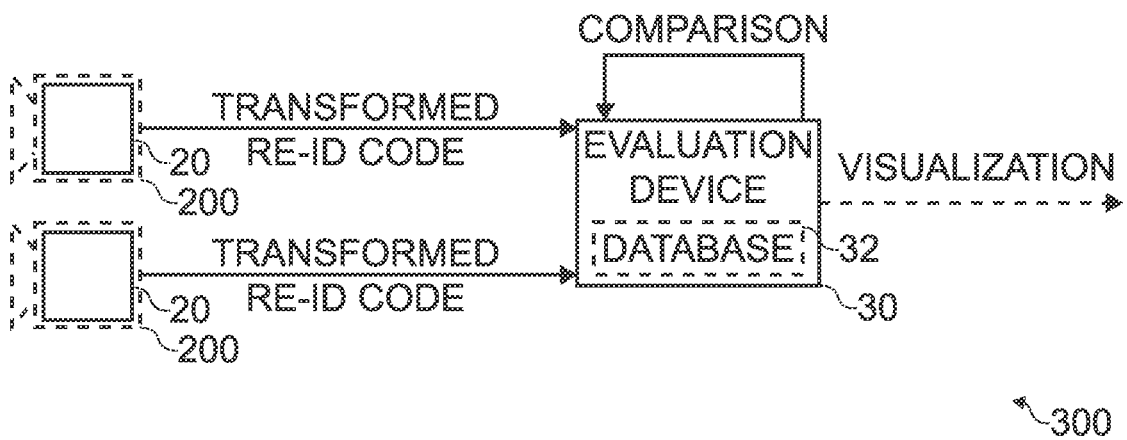
FIGS. 3a and 3b show schematic block diagrams of examples of a system comprising at least one apparatus for re-identification or at least one apparatus for generating a transformed re-identification code.
Figure 3B:
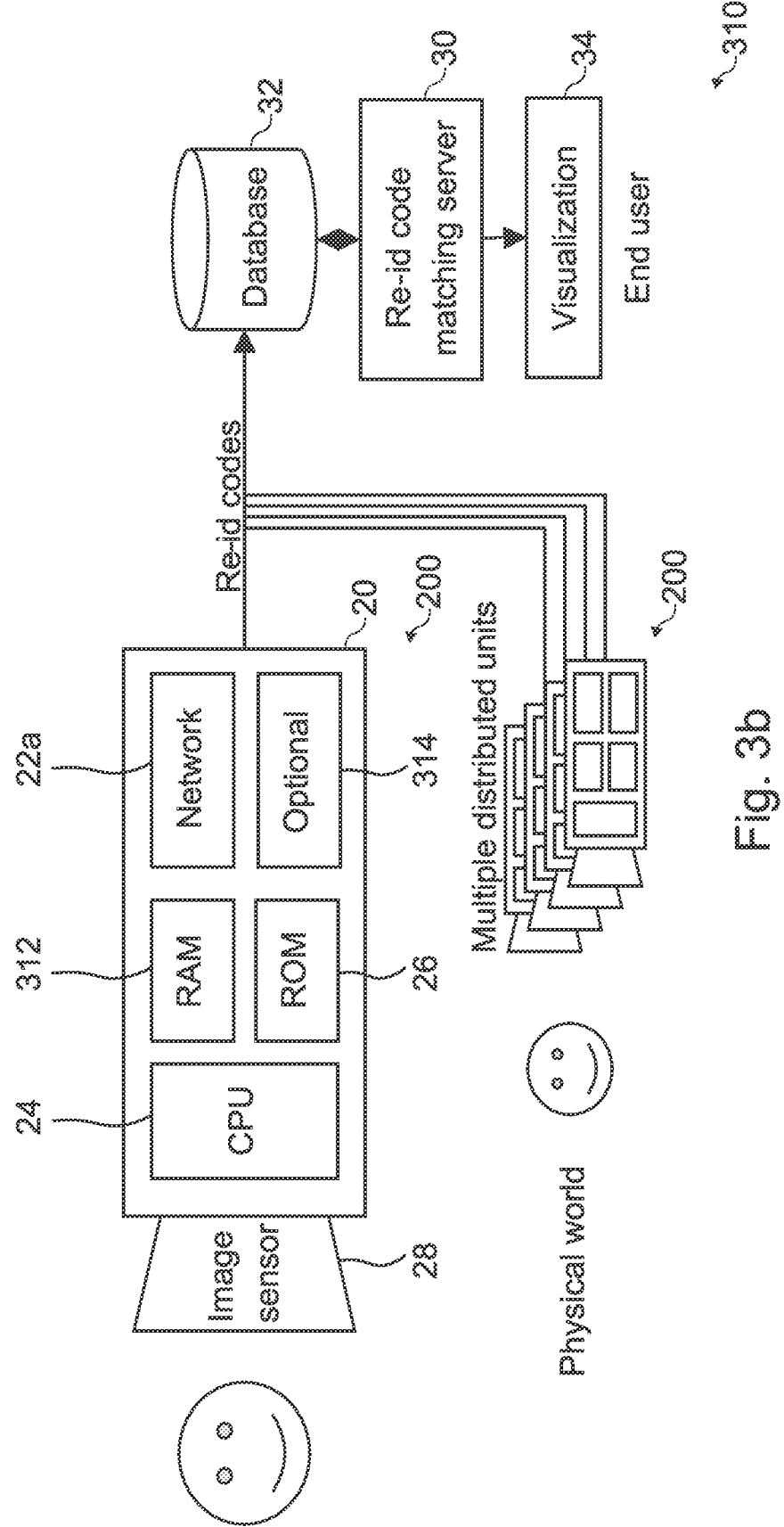

FIGS. 3a and 3b show schematic block diagrams of examples of systems 300; 310 comprising at least one apparatus 20 for re-identification or at least one apparatus 20 for generating a transformed re-identification code. While the apparatus for generating and transforming the re-identification codes is introduced in connection with FIGS. 2a to 2d, FIGS. 3a to 3b show the context, in which the apparatus can be used. In general, the system may comprise a single apparatus 20, e.g. as part of a camera device 200. The system 300 of FIG. 3a, as shown, comprises two camera devices 200 (or more general, two media data generation devices 200) each comprising an apparatus 20. The system 310 of FIG. 3b comprises a plurality of camera devices 200 each comprising an apparatus 20. In other words, the system 300; 310 comprise two or more apparatuses 20. As shown in FIG. 3b, the apparatus 20 may comprise one or more additional components, such as Random Access Memory (RAM) 312 or one or more optional components 314. The apparatus 20 shown in FIG. 3b comprises a network interface 22a, which may be a part of the interface 22 introduced in connection with FIGS. 2a and 2b.

In addition to the apparatus 20, or a camera device with the apparatus 20, the system may optionally comprise an evaluation device, which may be used to perform the re-identification using the transformed re-identification codes. In other words, the systems shown in FIGS. 3a and 3b comprise an optional evaluation device 30 with a database (e.g. the database introduced in connection with FIGS. 2a to 2d), which is coupled to the apparatuses 20. As shown in FIG. 3b, the evaluation device 30 may be implemented as a re-identification code matching server 30, which may communicate with the database 32. The evaluation device may be configured to obtain transformed re-identification codes from the at least one apparatus 20, and to compare the transformed re-identification codes provided by the at least one apparatus according to the similarity metric. For example, the evaluation device may be configured to obtain the transformed re-identification codes from the at least one apparatus 20 via the database 32. In general, the evaluation may be configured to perform re-identification based on the transformed re-identification codes of the apparatuses. In general, the evaluation device 30 may be external to the apparatuses 20. In some examples, however, one of the apparatuses may comprise the evaluation device 30. As shown in FIG. 3b, the evaluation device 30 may provide a visualization 34 to the end user. For example, the visualization may show a result of the re-identification being performed by the evaluation device 30.

There are various types of results that can be visualized. For example, the evaluation device may be configured to estimate the time of travel, of a person, animal or vehicle, between two distinct locations using transformed re-identification codes that are generated based on image data of a sensor at each endpoint. Accordingly, the visualization may show a visual representation of the estimated time of travel of different persons, animals or vehicles, and/or statistical evaluations thereof.

Alternatively or additionally, the evaluation device may be configured to filter duplicate detections when counting unique visitors at a particular location during a single day based on the transformed re-identification codes. The visualization may show a visual representation of the count of the (filtered) unique visitors at that particular location, and/or statistical evaluations thereof, such as a histogram over time.

In some examples, the evaluation device may be configured to calculate the time of stay of customers at a single location based on the transformed re-identification codes. Accordingly, the visualization may show a visual representation of the time of stay of the customers at that location, and/or statistical evaluations thereof, such as a histogram.

The evaluation device may be configured to perform wide-area people tracking using nonoverlapping cameras based on the transformed re-identification codes. For example, both two-dimensional images and three-dimensional representations of the persons may be used for the tracking. Correspondingly, the visualization may show a visual representation of the tracked people.

Depending on whether the transformation parameter being used by the apparatus or apparatuses is dependent on time or location, different criteria may be satisfied by the transformation parameters being used. For example, the transformation parameter is dependent on a time (i.e. a current time at the apparatus). The two or more apparatuses may be configured to use the same transformation parameter at the same time, e.g. such that transformed re-identification codes being generated at the same time are suitable for being used for re-identification.

On the other hand, if the transformation parameter is dependent on the location, the transformation parameter may be different depending on the location that the respective media data has originated from. In other words, the one or more (or two or more apparatuses) may be configured to process media data originating from two or more locations, and to use different transformation parameters for the media data originating from the two or more locations, as has been described in connection with FIGS. 2a to 2d. Additionally, a gradual adaptation of the transformation parameter based on the respective location the media data has originated from may also be applied, e.g. in a scenario with three or more media data generation devices.

More details and aspects of the system are mentioned in connection with the proposed concept or one or more examples described above or below (e.g. FIG. 1 to 2d, to 4a to 4b). The system may comprise one or more additional optional features corresponding to one or more aspects of the proposed concept or one or more examples described above or below.

Figure 4A:
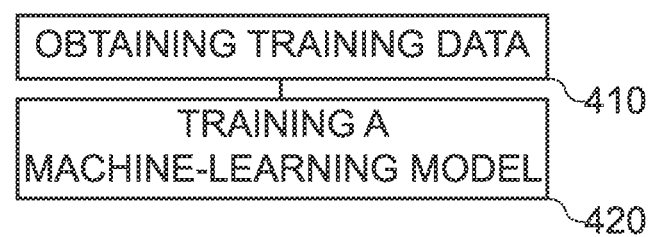
FIG. 4a shows a flow chart of an example of a method for training a machine-learning model.

In the following, various examples are introduced for training a machine-learning model that can be used for performing a non-linear transformation of a re-identification code. FIG. 4a shows a flow chart of an example of a method for training a machine-learning model. The method comprises obtaining 410 training data for training the machine-learning model. The training data comprises at least a plurality of re-identification codes. The method comprises training 420 the machine-learning model using the training data. The machine-learning model is trained to non-linearly transform the plurality of re-identification codes into a plurality of transformed re-identification codes such, that if a re-identification code is similar to a further re-identification code according to a similarity metric, the transformed re-identification code is similar to a further transformed re-identification code being a transformed version of the further re-identification code.

Figure 4B:
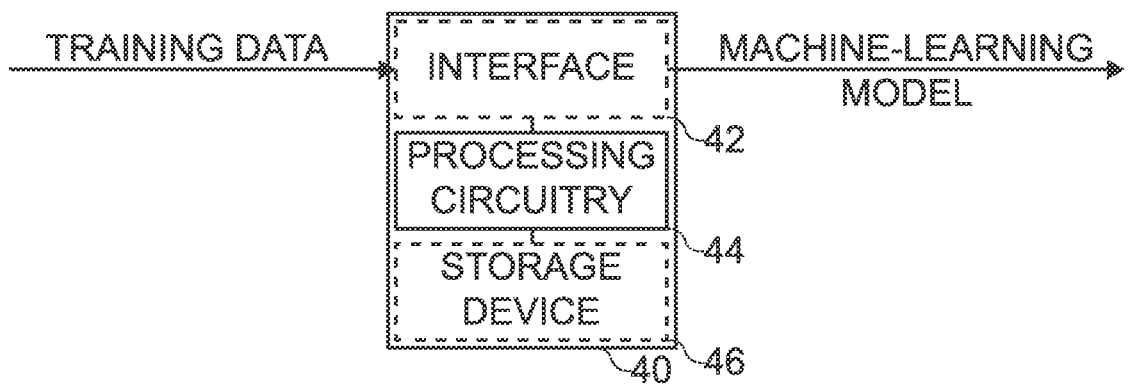
FIG. 4b shows a schematic block diagram of an example of an apparatus for training a machine-learning model.

FIG. 4b shows a schematic block diagram of an example of a corresponding apparatus 40 for training the machine-learning model. In general, the apparatus 40 comprises processing circuitry 44 configured to perform the method of FIG. 4a. For example, the processing circuitry is configured to obtain the training data for training the machine-learning model. The processing circuitry is configured to train the machine-learning model using the training data. Optionally, the apparatus 40 further comprises an interface 42 for exchanging information, such as the training data and the machine-learning model, and one or more storage devices 46 for storing information, such as the training data and the machine-learning model. The processing circuitry is coupled with the interface and the one or more storage devices.

The following description relates both to the method of FIG. 4a and to the corresponding apparatus 40 of FIG. 4b.

FIGS. 4a and 4b relate to the training of the machine-learning model that can be employed for non-linearly transforming re-identification codes. In general, machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information, or classification information, as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. In the concept presented in the present disclosure, machine learning may be used for two aspects—for non-linearly transforming re-identification codes, and for generating the re-identification codes in the first place.

Machine-learning models are trained using training data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training.

A similar approach may be chosen to train the machine-learning model based on the training data. For example, the training data may comprise the plurality of re-identification codes and, additionally, a plurality of exemplary transformation parameters, as input data values, and a plurality of desired output values representing desired non-linear transformations of the plurality of re-identification codes in view of the plurality of exemplary transformation parameters.

One type of machine-learning algorithm being used to determine similarity between media is denoted triplet loss. In triplet loss, a baseline input is compared to a positive input and a negative input. For example, triplet loss may be used to train a machine-learning model for generating the re-identification codes in the first place. Triplet loss, however, may also be used to train the machine-learning model for transforming the re-identification code. For example, the plurality of re-identification code may be used as training input, together with a plurality of exemplary transformation parameters. The machine-learning model may be trained to nonlinearly transform the plurality of re-identification codes based on the plurality of exemplary transformation parameters, by training the machine-learning model such that, for a given re-identification code provided at the input, a transformed version of a re-identification code that is similar to the given re-identification code is provided as positive input, and a transformed version of a re-identification code that is dissimilar to the given re-identification code, or the given re-identification code itself, is provided as negative input.

Reinforcement learning is another group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

For example, reinforcement learning may be used to train the machine-learning model. In this case, the plurality of re-identification codes may be processed by the machine-learning model, which may be iteratively adapted by reinforcement learning using a reward function that rewards an output that a) satisfies the equivalent class preserving property and b) is a non-linear transformation.

In general, the plurality of identification codes may be generated based on media data using a further machine-learning model. The further machine-learning model may implement the hashing function introduced in connection with FIG. 2a and/or 2b. The training of the further machine-learning model may be adapted based on the machine-learning based transformation of the resulting re-identification code. In other word, the machine-learning model and the further machine-learning model may be jointly trained. For example, a combined triplet loss-based training may be applied on both the further machine-learning model and the machine-learning model, with the training inputs of the further machine-learning model being based on media data, and the input of the machine-learning model being based on the re-identification codes provided by the further machine-learning model.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g. based on the training performed by the machine-learning algorithm. In examples, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input. In at least some examples, the machine-learning model may be deep neural network, e.g. a neural network comprising one or more layers of hidden nodes (i.e. hidden layers), preferably a plurality of layers of hidden nodes. For example, if the triplet loss function is being used, the ANN may be a so-called Siamese Neural Network (SNN).

The interface 42 may correspond to one or more inputs and/or outputs for receiving and/or transmitting information, which may be in digital (bit) values according to a specified code, within a module, between modules or between modules of different entities. For example, the interface 42 may comprise interface circuitry configured to receive and/or transmit information. Additionally or alternatively, the interface 42 may be suitable for communicating via a computer network, e.g. via a wireless or wired computer network.

The processing circuitry 44 may be implemented using one or more processing units, one or more processing devices, any means for processing, such as a processor, a computer or a programmable hardware component being operable with accordingly adapted software. In other words, the described function of the processing circuitry 44 may as well be implemented in software, which is then executed on one or more programmable hardware components. Such hardware components may comprise a general-purpose processor, a Digital Signal Processor (DSP), a micro-controller, etc. In various examples, the processing circuitry may comprise accelerator circuitry, such as circuitry for accelerating the training of machine-learning models, or GPGPU (General-Purpose Graphics Processing Unit) circuitry.

In at least some embodiments, the one or more storage devices 46 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for re-identification, the apparatus comprising processing circuitry configured to:
   obtain media data via an interface;
   generate a re-identification code representing at least a portion of the media data using a hashing algorithm;
   transform the re-identification code using a transformation functionality to obtain a transformed re-identification code,
      wherein the transformation functionality is configured to transform the re-identification code such that, if the re-identification code is similar to a further re-identification code generated by the hashing algorithm according to a similarity metric, the transformed re-identification code is similar to a further transformed re-identification code being a transformed version of the further re-identification code,
      wherein the transformation functionality is configured to transform the re-identification code based on a transformation parameter, the transformation parameter being dependent on a time,
      wherein the processing circuitry is configured to generate two transformation parameters for two points in time, and to gradually adapt the transformation parameter according to a pre-defined time schedule, the adaptation based on a linear interpolation between the two transformation parameters in between the two points in time; and
   provide the transformed re-identification code.

2. The apparatus according to claim 1, wherein the processing circuitry is configured to delete a previously used transformation parameter after adapting the transformation parameter.

3. The apparatus according to claim 1, wherein the transformation parameter is derived from a cryptographic secret.

4. The apparatus according to claim 1, wherein the transformation functionality is configured to perform a non-linear transformation of the re-identification code.

5. The apparatus according to claim 4, wherein the transformation functionality is configured to perform the non-linear transformation using a machine-learning model.

6. The apparatus according to claim 1, wherein the media data is one of image data, video data, audio data, a three-dimensional representation of movement of an object and text-based media data.

7. The apparatus according to claim 1, wherein the processing circuitry is configured to obtain the media data from an imaging sensor of a camera, the media data being one of image data and video data,
   or wherein the processing circuitry is configured to obtain the media data from one or more media data generation devices via a network.

8. The apparatus according to claim 7, wherein the processing circuitry is configured to obtain the media data from two or more media data generation devices being located at different locations, wherein the transformation parameter is further dependent on a location, wherein the processing circuitry is configured to perform the transformation using different transformation parameters for the two or more media data generation devices being located at different locations.

9. The apparatus according to claim 8, wherein the processing circuitry is configured to obtain the media data from a first, a second and a third media data generation device being located at different locations, with the second media data generation device being located between the first and the third media data generation device, wherein the processing circuitry is configured to generate the transformation parameter for the media data obtained from the second media data generation device based on a linear interpolation between transformation parameters used for the media data obtained from the first and third media data generation devices.

10. A camera device comprising an imaging sensor and the apparatus according to claim 1.

11. A system comprising two or more apparatuses according to claim 1.

12. The system according to claim 11, wherein the two or more apparatuses are configured to use the same transformation parameter at the same time,
   or wherein the transformation parameter is dependent on a location, wherein the two or more apparatuses are configured to process media data originating from two or more locations, and to use different transformation parameters for the media data originating from the two or more locations.

13. A method for training a machine-learning model, the method comprising:
   obtaining training data for training the machine-learning model, the training data comprising at least a plurality of re-identification codes; and
   training the machine-learning model using the training data, the machine-learning model being trained to non-linearly transform the plurality of re-identification codes into a plurality of transformed re-identification codes such that if a re-identification code is similar to a further re-identification code according to a similarity metric, the transformed re-identification code is similar to a further transformed re-identification code being a transformed version of the further re-identification code,
   wherein the transformation of each re-identification code is based on a transformation parameter, the transformation parameter being dependent on a time,
   wherein two transformation parameters are generated for two points in time, and the transformation parameter is gradually adaptable according to a pre-defined time schedule, the adaptation based on a linear interpolation between the two transformation parameters in between the two points in time.

14. An apparatus for re-identification, the apparatus comprising processing circuitry configured to:
obtain media data via a network interface from a first, a second, and a third media data generation device being located at different locations, with the second media data generation device being located between the first and the third media data generation device;
generate a re-identification code representing at least a portion of the media data using a hashing algorithm;
transform the re-identification code using a transformation functionality to obtain a transformed re-identification code,
wherein the transformation functionality is configured to transform the re-identification code such that, if the re-identification code is similar to a further re-identification code generated by the hashing algorithm according to a similarity metric, the transformed re-identification code is similar to a further transformed re-identification code being a transformed version of the further re-identification code,
wherein the transformation functionality is configured to transform the re-identification code based on a transformation parameter, the transformation parameter being dependent on a time and/or a location,
wherein the processing circuitry is configured to perform the transformation using different transformation parameters for the first, the second, and the third media data generation devices,
wherein the processing circuitry is configured to generate the transformation parameter for the media data obtained from the second media data generation device based on a linear interpolation between transformation parameters used for the media data obtained from the first and third media data generation devices; and
provide the transformed re-identification code.

* * * * *